United States Patent
Kim et al.

(10) Patent No.: US 9,858,000 B2
(45) Date of Patent: Jan. 2, 2018

(54) STORAGE DEVICE AND SUSTAINED STATUS ACCELERATING METHOD THEREOF

(71) Applicant: SAMSUNG ELECTRONICS CO., LTD., Suwon-si (KR)

(72) Inventors: Su-Gon Kim, Seoul (KR); Sangyong Lee, Hwaseong-si (KR); Dongbin Park, Seoul (KR); Chanik Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 37 days.

(21) Appl. No.: 14/978,606

(22) Filed: Dec. 22, 2015

(65) Prior Publication Data

US 2016/0216908 A1  Jul. 28, 2016

(30) Foreign Application Priority Data

Jan. 22, 2015 (KR) .................. 10-2015-0010618

(51) Int. Cl.
*G06F 3/06* (2006.01)
*G06F 12/02* (2006.01)

(52) U.S. Cl.
CPC .......... *G06F 3/0619* (2013.01); *G06F 3/0652* (2013.01); *G06F 3/0679* (2013.01); *G06F 3/0688* (2013.01); *G06F 12/0246* (2013.01)

(58) Field of Classification Search
CPC .... G06F 3/0652; G06F 3/0679; G06F 3/0688; G06F 3/0619; G06F 12/0246
See application file for complete search history.

(56) References Cited

U.S. PATENT DOCUMENTS

| | | | |
|---|---|---|---|
| 6,735,106 B2 | 5/2004 | Rickes et al. |
| 7,679,133 B2 | 3/2010 | Son et al. |
| 8,166,231 B2 | 4/2012 | Ono et al. |
| 8,166,233 B2 | 4/2012 | Schibilla et al. |
| 8,171,254 B2 | 5/2012 | Takamiya et al. |
| 8,397,014 B2 | 3/2013 | Khmelnitsky et al. |
| 8,417,893 B2 | 4/2013 | Khmelnitsky et al. |
| 8,553,466 B2 | 10/2013 | Han et al. |
| 8,559,235 B2 | 10/2013 | Yoon et al. |
| 8,654,587 B2 | 2/2014 | Yoon et al. |
| 8,738,846 B2 | 5/2014 | Son et al. |
| 8,745,315 B2 | 6/2014 | Ware et al. |
| 8,799,622 B2 | 8/2014 | Lee et al. |
| 2004/0004854 A1 | 1/2004 | Rickes et al. |
| 2009/0121271 A1 | 5/2009 | Son et al. |

(Continued)

FOREIGN PATENT DOCUMENTS

KR   101392174 B1   5/2014

*Primary Examiner* — David X Yi
*Assistant Examiner* — Zubair Ahmed
(74) *Attorney, Agent, or Firm* — Sughrue Mion, PLLC

(57) ABSTRACT

A sustained status accelerating method for a storage device includes: controlling the storage device to receive a sustained status command from the outside; and controlling the storage device to enter the sustained status using a sustained valid page count (SVPC) table in response to the sustained status command so that each of a plurality of blocks constituting the storage device has a value greater than a predetermined valid page count. The SVPC table includes a valid page count with respect to each of the blocks in the storage device.

19 Claims, 12 Drawing Sheets

(56) References Cited

U.S. PATENT DOCUMENTS

| | | |
|---|---|---|
| 2009/0198902 A1 | 8/2009 | Khmelnitsky et al. |
| 2009/0198947 A1 | 8/2009 | Khmelnitsky et al. |
| 2010/0077136 A1 | 3/2010 | Ware et al. |
| 2010/0115185 A1* | 5/2010 | Ono .................. G06F 12/0246 |
| | | 711/103 |
| 2011/0022778 A1 | 1/2011 | Schibilla et al. |
| 2011/0191566 A1 | 8/2011 | Takamiya et al. |
| 2011/0216603 A1 | 9/2011 | Han et al. |
| 2011/0233648 A1 | 9/2011 | Seol et al. |
| 2012/0051143 A1 | 3/2012 | Yoon et al. |
| 2012/0066443 A1 | 3/2012 | Li et al. |
| 2012/0096217 A1 | 4/2012 | Son et al. |
| 2012/0173797 A1 | 7/2012 | Shen |
| 2012/0221829 A1 | 8/2012 | Lee et al. |
| 2013/0132647 A1 | 5/2013 | Melik-Martirosian |
| 2013/0279262 A1 | 10/2013 | Yoon et al. |
| 2013/0326121 A1 | 12/2013 | Cheng |
| 2014/0068152 A1 | 3/2014 | Sinclair |
| 2014/0149647 A1* | 5/2014 | Guo ......................... G06F 3/06 |
| | | 711/103 |
| 2014/0173176 A1 | 6/2014 | Kang |
| 2014/0258596 A1 | 9/2014 | Kojima |
| 2016/0019127 A1* | 1/2016 | Creasman ........... G06F 11/2094 |
| | | 714/6.3 |
| 2016/0141042 A1* | 5/2016 | Peterson ................ G11C 16/26 |
| | | 365/185.11 |
| 2016/0180959 A1* | 6/2016 | Darragh ................ G06F 3/0653 |
| | | 365/185.09 |

* cited by examiner

STORAGE DEVICE AND SUSTAINED STATUS ACCELERATING METHOD THEREOF

CROSS-REFERENCE TO THE RELATED APPLICATION

This application claims priority from Korean Patent Application No. 10-2015-0010618, filed on Jan. 22, 2015, the entire disclosure of which in incorporated herein by reference.

BACKGROUND

Apparatuses and methods consistent with exemplary embodiments relate to a storage device, and more particularly, to a sustained status accelerating method thereof.

A semiconductor memory device is divided into a volatile semiconductor device and a nonvolatile semiconductor memory device. The nonvolatile semiconductor memory device can retain its stored data even when its power supply is interrupted. The data stored in the nonvolatile semiconductor memory device may be permanent or reprogrammable depending on a memory manufacturing technology. The nonvolatile semiconductor memory device is used to store user data, a program and a micro code in a wide range of applications such as a computer, an avionics, a communication and a consumer electronic technology industry.

SUMMARY

Exemplary embodiments of the inventive concept provide a sustained status accelerating method of a storage device which includes at least one nonvolatile memory device and a memory controller controlling the nonvolatile memory device. The sustained status accelerating method may include controlling the storage device to receive a sustained status command from the outside, and controlling the storage device to enter the sustained status using a sustained valid page count (SVPC) table in response to the sustained status command so that each of a plurality of blocks included in the storage device has a value greater than a predetermined valid page count. The sustained valid page count table—includes a valid page count with respect to each of the blocks in the storage device.

The SVPC table may be stored in nonvolatile memory device in a manufacturing process of the storage device.

The above method may further include controlling the memory controller to read the SVPC table from the nonvolatile memory in response to the sustained status command.

The controlling the storage device to enter the sustained status may include initializing meta information of the storage device.

The controlling the storage device to enter the sustained status may include determining a valid page or an invalid page in at least one block of the blocks on the basis of the SVPC table.

The controlling the storage device to enter the sustained status may include forming the valid page in the block through a normal write operation. In the normal write operation, map information about the normal write operation is updated.

The controlling the storage device to enter the sustained status may include forming the invalid page in the block through a dummy write operation. In the dummy write operation, map information about the dummy write operation is not updated.

The controlling the storage device to enter the sustained status may include determining a range or an interval of a logical page number to perform a write operation using the SVPC table.

The controlling the storage device to enter the sustained status may include sequentially filling data in the blocks by performing a normal write operation on the blocks and performing a dummy write operation corresponding to an invalid page while adjusting the range or the interval of the logical page number so that a valid page is randomly distributed in at least one block of the blocks while adjusting a valid page count on the basis of the SVPC table.

The controlling the storage device to enter the sustained status may include updating meta information of the storage device in the sustained status.

The controlling the storage device to enter the sustained status may include testing integrity of the updated meta information.

The sustained status command may be input for a performance test of the storage device.

Exemplary embodiments of the inventive concept also provide a storage device. The storage device may include at least one nonvolatile memory which is configured to store an SVPC table and comprises a plurality of blocks each having a plurality of pages, and a memory controller configured to control the nonvolatile memory. The memory controller comprises a buffer memory configured to store the SVPC table read from the nonvolatile memory in response to receiving a sustained status command, and a sustained status accelerating module configured to form a sustained status through at least one of a normal write operation and a dummy write operation using the SVPC table.

The SVPC table is stored in the nonvolatile memory in a manufacturing process of the storage device.

The sustained status accelerating module may perform the dummy write operation to form an invalid page in at least one block of the blocks, and update map information about the dummy write operation. The sustained status accelerating module may also perform normal write operation to form a valid page corresponding to the SVPC table in the block, update map information about the normal write operation is updated, and determine a range and an interval of a logical page number on which the normal write operation is performed according to a predetermined value.

BRIEF DESCRIPTION OF THE DRAWINGS

Exemplary embodiments of the inventive concept will be described below in more detail with reference to the accompanying drawings. The inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION OF THE EXEMPLARY EMBODIMENTS

Figure 1:
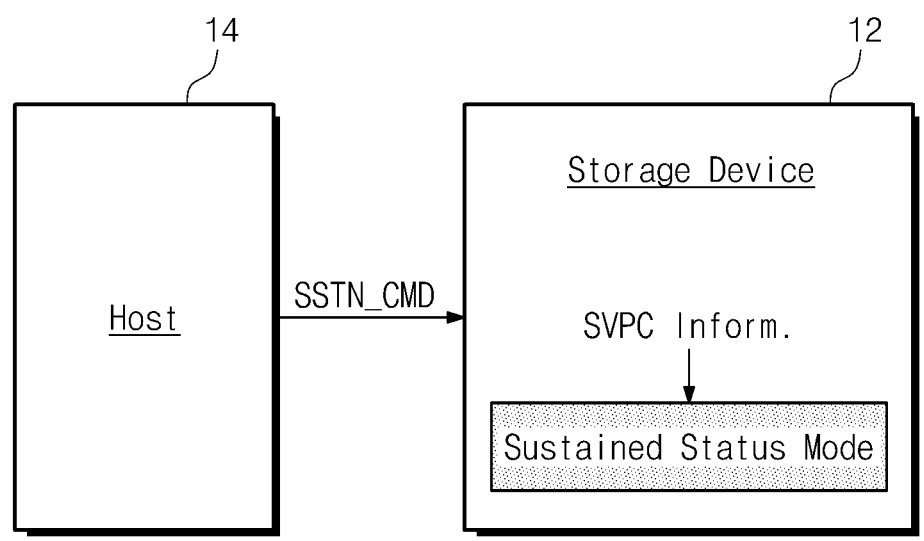
FIG. 1 is a block diagram illustrating a host system for explaining a concept of the invention, according to an exemplary embodiment.

Exemplary embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram illustrating a host system according to an exemplary embodiment for explaining an inventive concept. Referring to FIG. 1, a host system 10 includes a storage device 12 and a host 14 for controlling the storage device 12.

According to an exemplary embodiment, the storage device 12 is a storage medium which stores user data. For example, the storage device 12 may be a solid state drive (SSD), a memory card such as compact flash (CF), secure digital (SD), microSD, etc., or a universal serial bus (USB) memory, not being limited thereto.

According to another exemplary embodiment, the storage device 12 may be constituted by a nonvolatile memory. The nonvolatile memory may be a NAND flash memory, a vertical NAND flash memory (VNAND), a NOR flash memory, a resistive random access memory (RRAM), a phase-change random access memory (PRAM), a magneto resistive random access memory (MRAM), a ferroelectric random access memory (FRAM), a spin transfer torque random access memory (STT-RAM), etc. The nonvolatile memory may also be embodied by a three-dimensional array structure.

According to still another exemplary embodiment, a three dimensional (3D) memory array may be provided as a nonvolatile memory. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array. According to an exemplary embodiment, the 3D memory array includes vertical NAND strings that are vertically oriented such that at least one memory cell is located above another memory cell. The at least one memory cell may comprise a charge trap layer. Each vertical NAND string may include at least one select transistor located above memory cells, the at least one select transistor having the same structure with the memory cells and being formed monolithically together with the memory cells.

The following patent documents, which are hereby incorporated by reference, describe suitable configurations for 3D memory arrays, in which the 3D memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

The inventive concept is applicable not only to a flash memory of which a charge storage layer is constituted by a conductive floating gate but also to a charge trap flash (CTF) of which a charge storage layer is constituted by an insulating layer. It is assumed that the storage device 12 is a flash storage device embodied by a flash memory.

The storage device 12 can enter a sustained status in response to a sustained status command SSTN_CMD. The sustained status means that a plurality of blocks constituting the storage device 12 have a similar level of valid page count (VPC). That is, each block in the storage device 12 has a predetermined valid page count. In the sustained status, victim blocks which become a garbage collection target have a similar level of sustained valid page count (SVPC). Thus, when performing a garbage collection in the sustained status, since deviations of SVPC which blocks being selected as a source have are not great, a similar level of valid page copy is performed and thus predictable performance of the storage device 12 is maintained.

Generally, the reason why a sustained status is important is that the sustained status is similar to an actual operation environment of products for a data center. A work load of the data center is mainly a random mixed input/output (I/O) and a storage device enters a sustained status. Thus, performance and quality of service (QoS) of the products for the data center are usually evaluated in the sustained status.

To initiate a sustained status, a general storage device performs a write operation for from several hours to several days while sequentially or randomly changing a data access pattern. The storage device 12 can enter a sustained status in response to a sustained status command SSTN_CMD, and when entering the sustained status, the storage device 12 can accelerate a sustained status using SVPC information extracted from another storage device in the sustained status. Here, the other storage device may be a storage device which is or was connected to the host 14, and the SVPC information may be extracted by the storage device 12 through the host 14.

Figure 2:
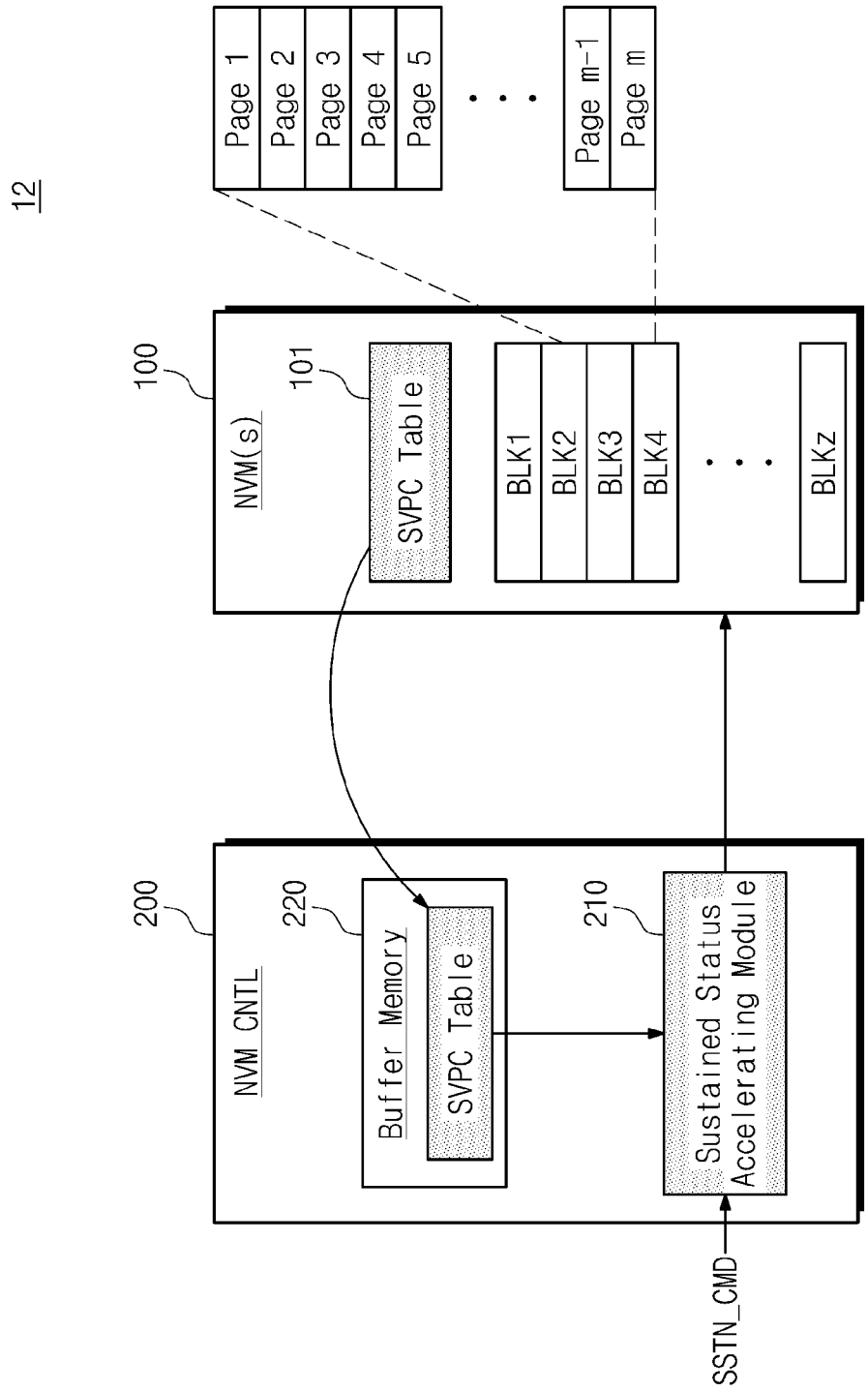
FIG. 2 is a block diagram illustrating an example of a storage device in accordance with an exemplary embodiment.

FIG. 2 is a block diagram illustrating an example of a storage device 12 in accordance with an exemplary embodiment. Referring to FIG. 2, the storage device 12 includes at least one nonvolatile memory 100 and a memory controller 200 controlling the nonvolatile memory 100.

The nonvolatile memory 100 includes a plurality of memory blocks BLK1-BLKz (z is an integer which is greater than or equal to 2). Each of the memory blocks BLK1-BLKz includes a plurality of pages Page 1-Page m (m is an integer which is greater than or equal to 2).

The nonvolatile memory 100 also includes an SVPC table 101 storing SVPC information extracted from another storage device in a sustained status. The SVPC information may be stored by a manufacturer when the storage device 12 is manufactured. In FIG. 2, the SVPC table is stored in the nonvolatile memory device 100. However, the inventive concept is not limited thereto. The SVPC table may be embodied to be stored in a nonvolatile memory disposed inside the memory controller 200.

The memory controller 200 includes a sustained status accelerating module 210 that accelerates a sustained status of the storage device 12 and a buffer memory 220. The sustained status accelerating module 210 can accelerate the sustained status using the SVPC table in response to a sustained status command SSTN_CMD. The sustained status accelerating module 210 may be embodied as hardware, software, firmware or a combination thereof.

The buffer memory 220 can read the SVPC table 101 from the nonvolatile memory 100. The buffer memory 220 can read the SVPC table 101 from the nonvolatile memory 100 in response to the sustained status command SSTN_CMD. The buffer memory 220 can also read the SVPC table 101 from the nonvolatile memory device 100 when the storage device 12 is powered up.

The storage device 12 can significantly reduce a test time in the sustained status compared with a conventional storage device by accelerating the sustained status based on the SVPC table extracted from another storage device in the sustained status.

Figure 3:
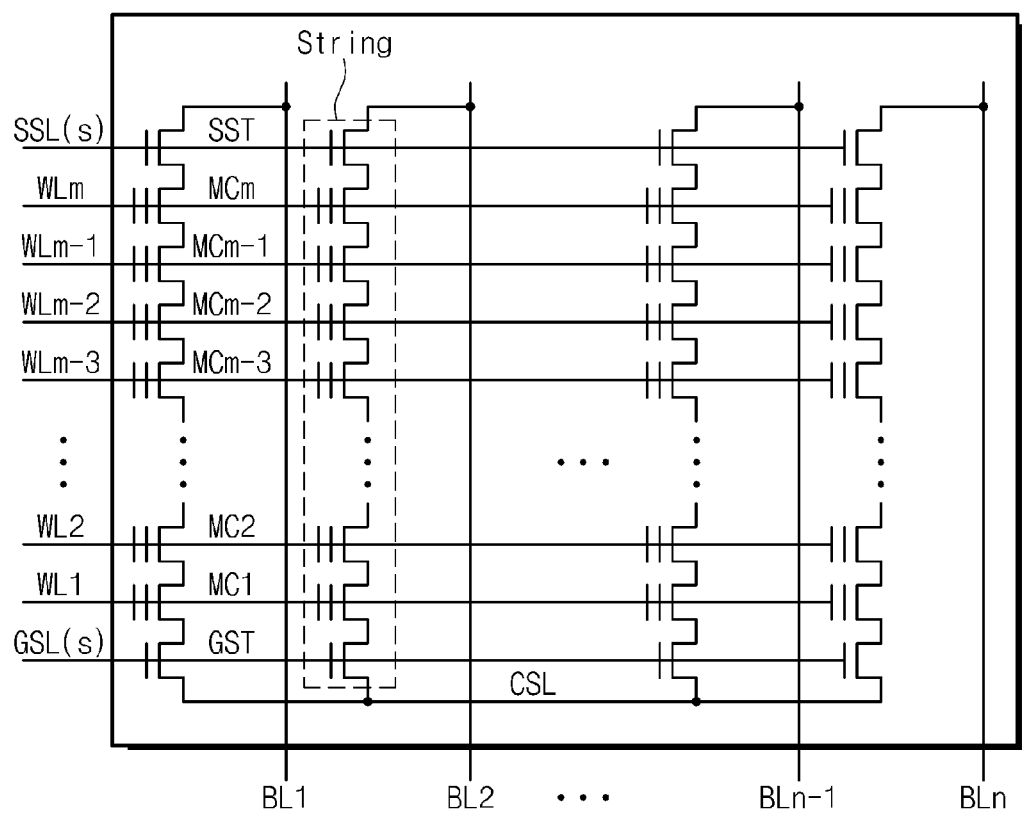
FIG. 3 is a drawing illustrating a circuit of a memory block in accordance with an exemplary embodiment.

FIG. 3 is a drawing which illustrates a circuit of a memory block BLK in accordance with an exemplary embodiment. Referring to FIG. 3, the memory block BLK includes strings connected to a plurality of bit lines BL1-BLn (n is an integer which is greater than or equal to 2). Each string includes at least one string select transistor SST, a plurality of memory cells MC1-MCm (m is an integer which is greater than or equal to 2) and at least one ground select transistor GST between a bit line BL and a common source line CSL. Each of the memory cells MC1-MCm can store at least one bit data. Although not illustrated, each string further includes at least one dummy cell between the string select transistor SST and the memory cells MC1-MCm and at least one dummy cell between the memory cells MC1-MCm and the ground select transistor GST.

Figure 4:
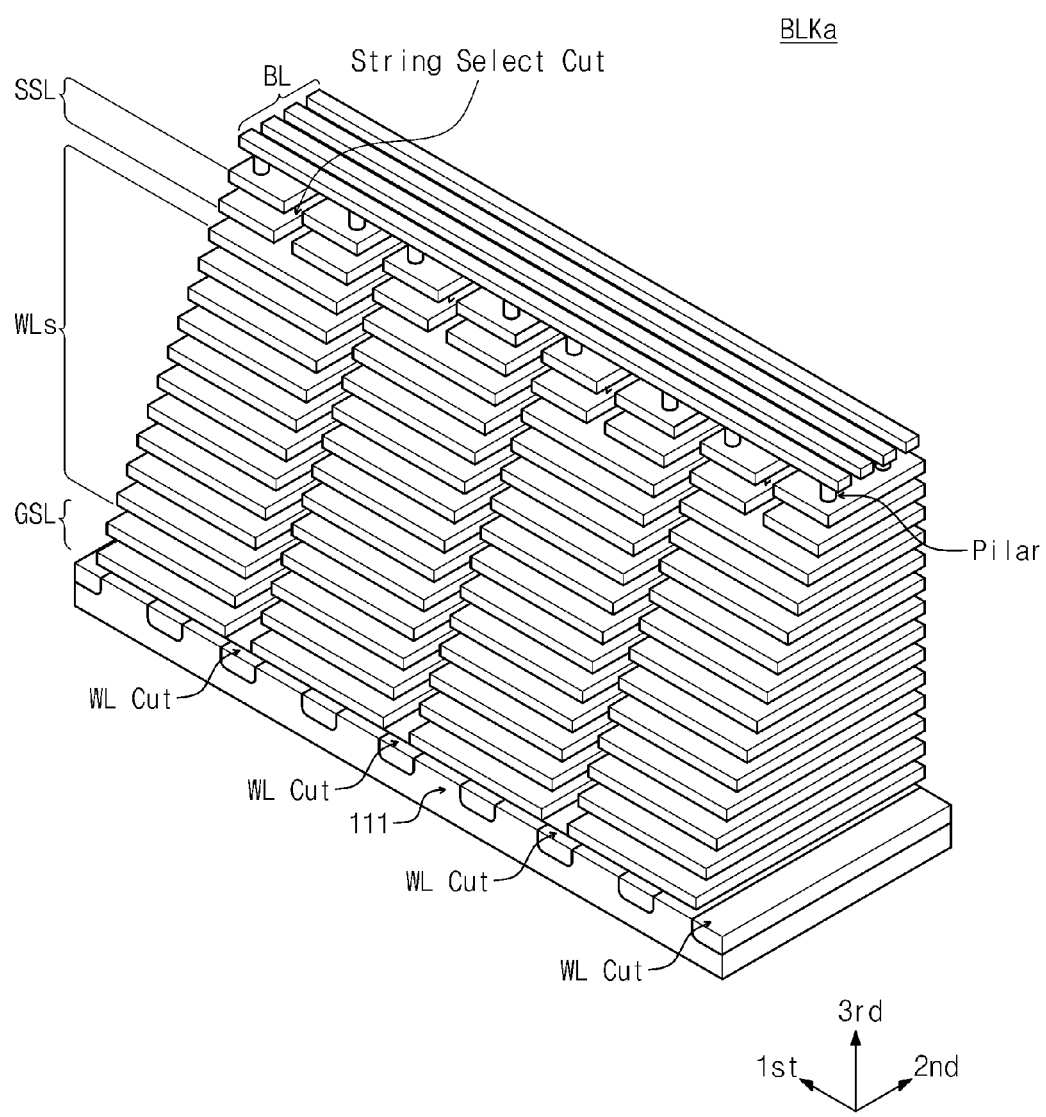
FIG. 4 is a drawing illustrating a memory block in accordance with an exemplary embodiment.

FIG. 4 is a illustrates a perspective view of a memory block BLKa in accordance with an exemplary embodiment. Referring to FIG. 4, four sub blocks are formed on a substrate. Each sub block is formed by stacking at least one ground select line GSL, a plurality of word lines WLs and at least one string select line SSL between word line cuts on the substrate in a plate-like form. The at least one string select line SSL is divided by a string select cut. In FIG. 4, the string select cut exists but the inventive concept is not limited thereto. The memory block of the inventive concept may be embodied so that the string select cut does not exist.

At least one dummy word line may be stacked in a plate-like form between the ground select line GSL and the word lines WLs, and at least one dummy word line may be stacked in a plate-like form between the string select line SSL and the word lines WLs.

Each word line cut, although not illustrated, includes a common source line CSL. Common source lines CSL included in word line cuts are connected in common. A pillar connected to a bit line BL may penetrate at least one ground select line GSL, a plurality of word lines WLs and at least one string select line SSL to form a string.

In FIG. 4, a target between the word line cuts is illustrated to be a sub block but the inventive concept is not necessarily limited thereto. The sub block of the inventive concept may call a target between the word line cut and the string select cut a sub block.

The block BLKa may be embodied by a structure in which two word lines are merged into one, that is, a merged word line structure.

Figure 5:
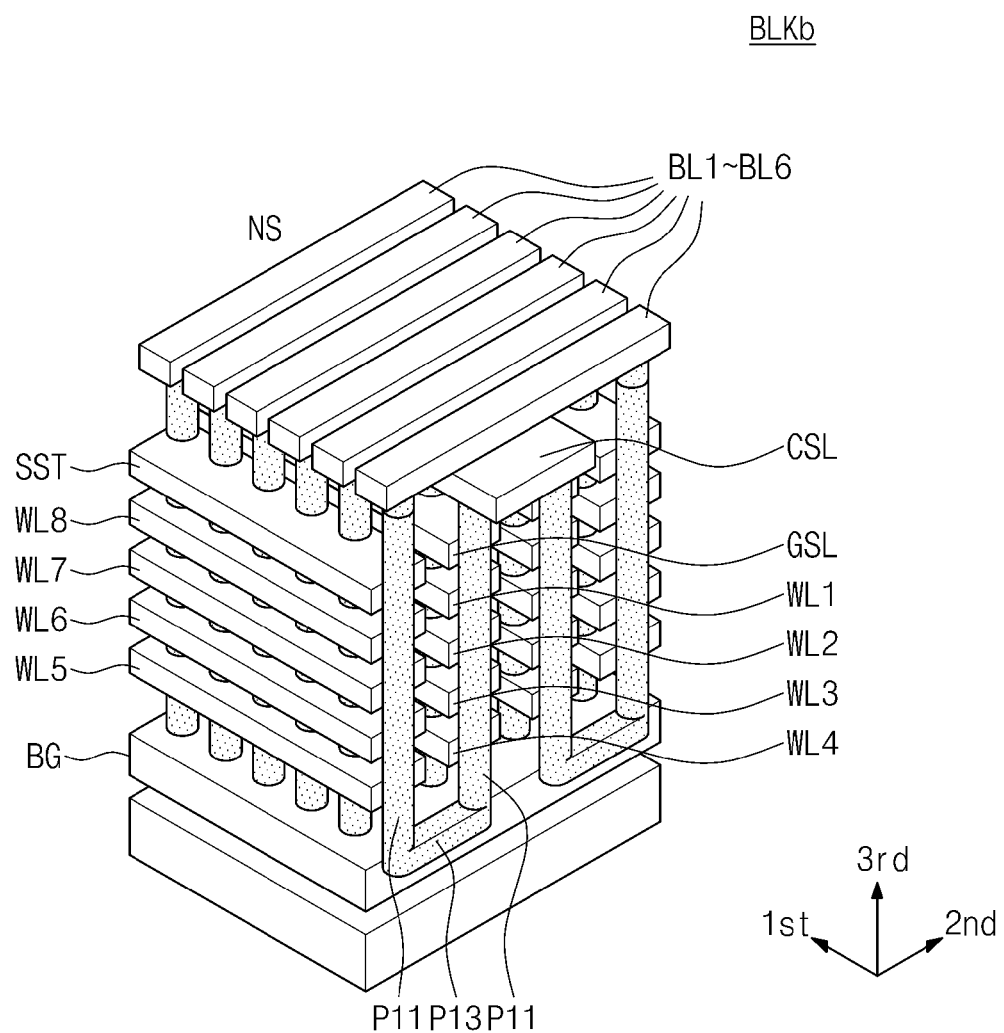
FIG. 5 is a drawing illustrating a memory block in accordance with an exemplary embodiment.

FIG. 5 is a drawing illustrating a memory block BLKb in accordance with an exemplary embodiment. Referring to FIG. 5, for convenience of description, it is assumed that the memory block BLKb includes four word lines. The memory block BLKb is embodied by a pipe-shaped bit cost scalable (PBiCS) structure that connects lower sections serially connected to one another using a pipe. The memory block BLKb includes strings NS of m×n (m, n are natural numbers).

In FIG. 5, m is 6 and n is 2. Each string NS includes memory cells MC1-MC8 serially connected to one another. A first upper section of the memory cells MC1-MC8 is connected to a string select transistor SST, a second upper section of the memory cells MC1— is connected to a ground select transistor GST and a lower section of the memory cells MC1-MC8 is connected to a pipe.

Memory cells constituting a string NS are stacked on a plurality of semiconductor layers. Each string NS includes a first pillar PL11, a second pillar PL12 and a pillar connection unit PL13 connecting the first pillar PL11 and the second pillar PL12. The first pillar PL11 is connected to a bit line (for example, BL1) and the pillar connection unit PL13 and is formed by penetrating a string select line SSL and the word lines WL5-WL8. The second pillar PL12 is connected to a common source line CSL and the pillar connection unit PL13 and is formed by penetrating a ground select line GSL and the word lines WL1-WL4. As illustrated in FIG. 5, the string NS is embodied in a U shape character form.

A back-gate BG may be formed on a substrate and the pillar connection unit PL13 may be embodied inside the back-gate BG. The back-gate BG may exist in the memory block BLKb in common. The back-gate BG may be a structure separated from a back-gate of another block.

For convenience of description, it is assumed that the storage device 12 is an SSD including a NAND flash memory.

Figure 6:
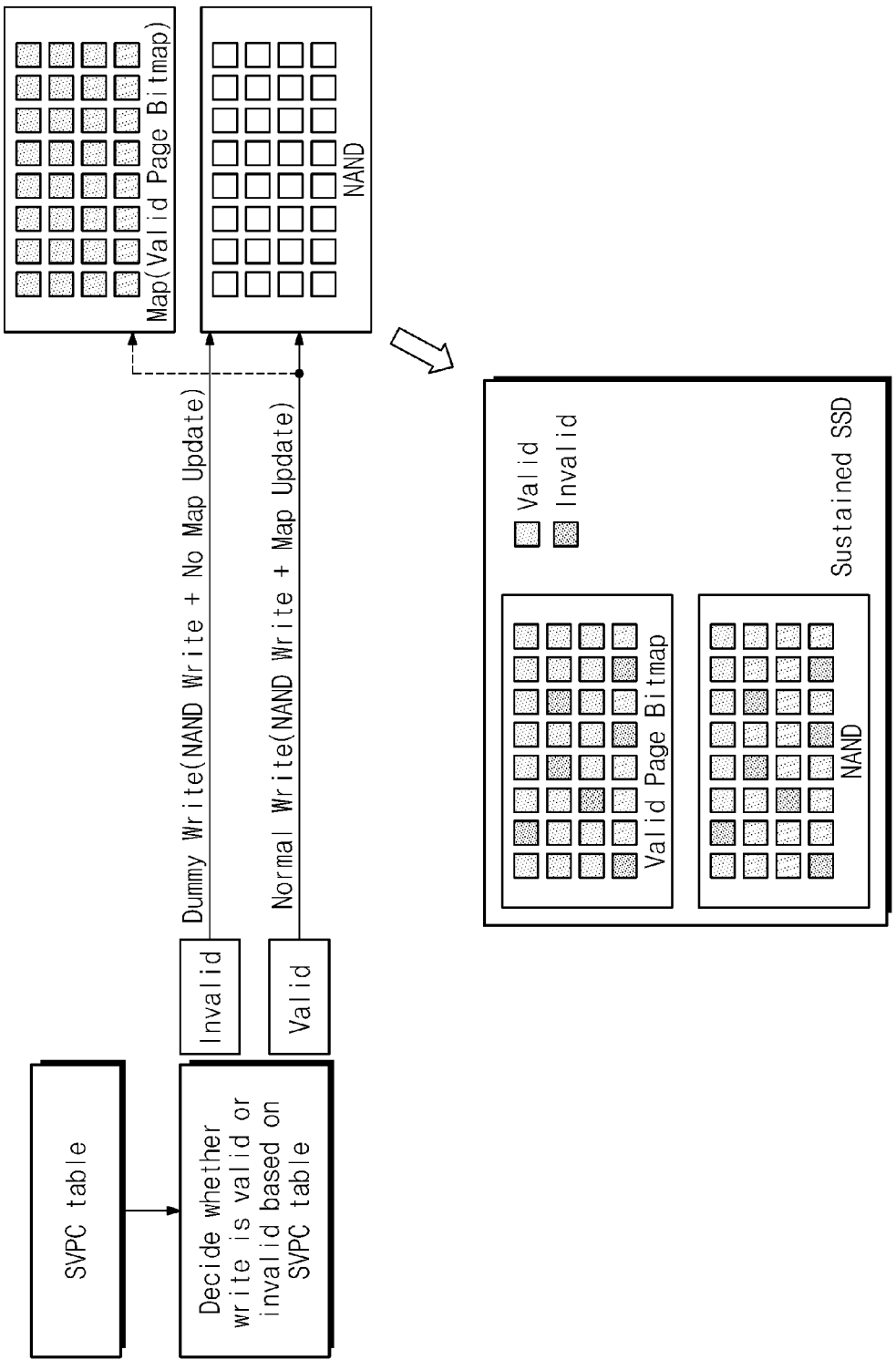
FIG. 6 is a drawing illustrating a sustained status accelerating operation of a storage device in accordance with an exemplary embodiment.

FIG. 6 is a drawing illustrating a sustained status accelerating operation of a storage in accordance with an exemplary embodiment. Referring to FIG. 6, a sustained status accelerating operation is constituted by a normal write and/or a dummy write using an SVPC table.

The normal write forms a valid page inside a block using the SVPC table. In the normal write, valid page bitmap information may be optionally updated. The dummy write forms an invalid page inside a block with dummy data using the SVPC table. Page bitmap information corresponding to the dummy write is not updated. As described above, a storage device may enter a sustained status according to the normal write and the dummy write. That is, a valid page and an invalid page may be formed in a block of a NAND flash memory according to a valid page bitmap table.

Figure 7:
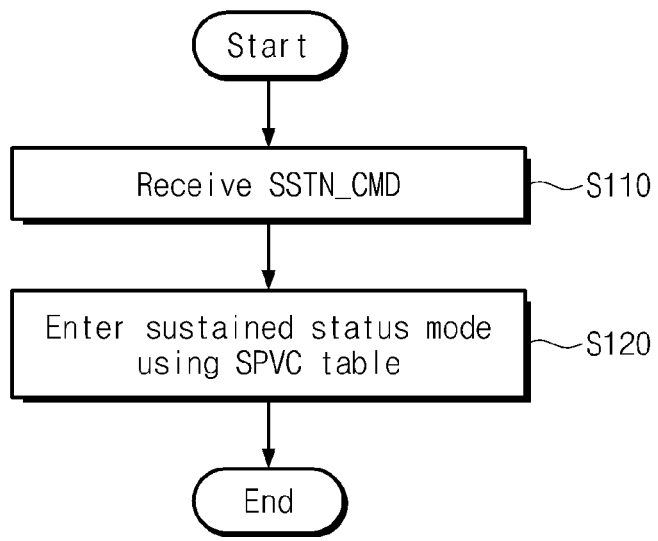
FIG. 7 is a flow chart illustrating a sustained status forming method of a storage device in accordance with an exemplary embodiment.

FIG. 7 is a flow chart illustrating a sustained status forming method of a storage device in accordance with an exemplary embodiment. Referring to FIGS. 1 through 7, a method of forming a sustained status is as follows. A sustained status command SSTN_CMD is input in the storage device 12 from the outside, for example, a tool of a host (S110). The storage device 12 enters a sustained status in response to the sustained status command SSTN_CMD (S120). In the sustained status, the sustained status accelerating module 210 (refer to FIG. 2) forms a sustained status by repeatedly performing the normal write and/or the dummy write using the SVPC table extracted from another storage device.

Figure 8:
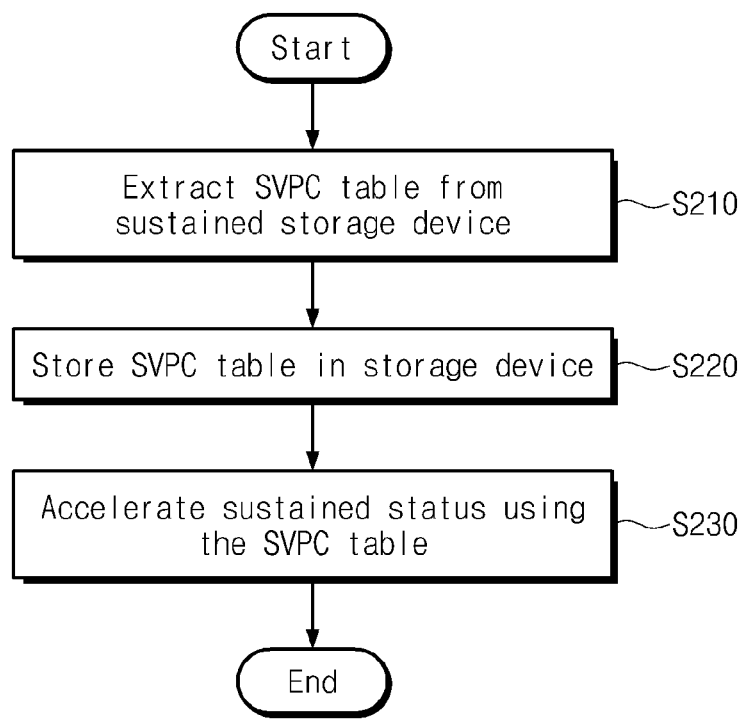
FIG. 8 is a flow chart illustrating a sustained status accelerating method of a storage device in accordance with an exemplary embodiment.

FIG. 8 is a flow chart illustrating a sustained status accelerating method of a storage in accordance with an exemplary embodiment. Referring to FIGS. 1 through 8, the sustained status accelerating operation proceeds as follows.

The SVPC table is extracted from a storage device in a sustained status (S210). In a manufacturing process of the storage device 12, the SVPC table is stored (S220). A formation of the sustained status of the storage device 12 is accelerated using the stored SVPC table (S230).

A sustained status accelerating operation of the storage device 12 can accelerate a sustained status using the SVPC table extracted from the other storage device.

Figure 9:
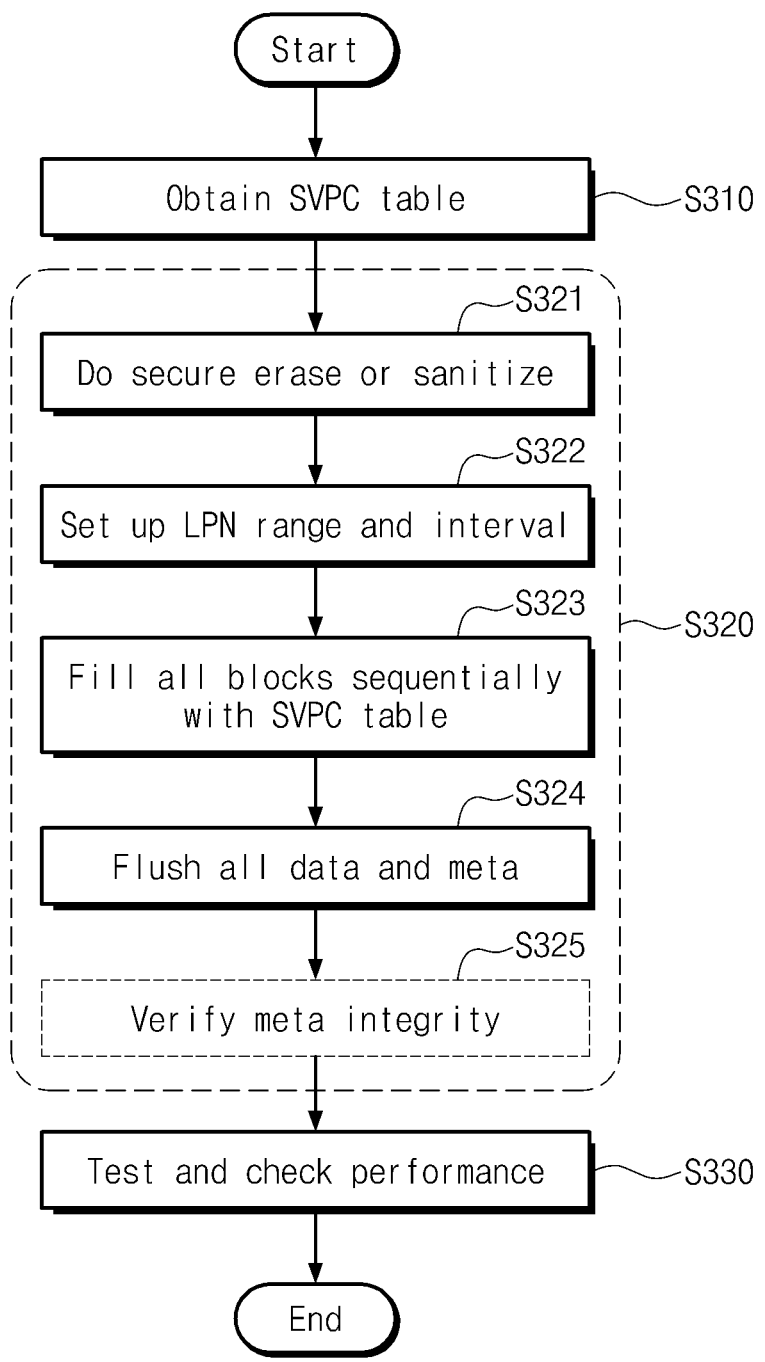
FIG. 9 is a drawing illustrating a flowchart of a performance test method in a sustained status of a storage device in accordance with an exemplary embodiment.

FIG. 9 is a drawing illustrating a flowchart of a performance test method in a sustained status of a storage device in accordance with an exemplary embodiment. Referring to FIGS. 1 through 9, a method of testing performance of the storage device 12 in a sustained status proceeds as follows.

The SVPC table is obtained from another storage device in a sustained status. For example, the SVPC table is formed by extracting information about the SVPC with respect to blocks in the other storage device in the sustained status. In a manufacturing process of a product, the SVPC table is built in the storage device 12 (S310).

After that, the storage device 12 enters the sustained status to evaluate performance of the storage device 12 in the sustained status (S320). The sustained status may be entered in response to the sustained status command SSTN_CMD being provided by an external host tool. The sustained status may be formed as follows.

Meta information of the storage device 12 is initialized. To achieve this, secure erase or sanitization with respect to the storage device 12 is performed (S321). The secure erase is to erase a mapping table and the sanitization is to erase a mapping table and data of all the blocks.

After that, a range and an interval of a logical page number (LPN) to be programmed are set up (S322). When overlapped LPNs are programmed in a state that the number of times of valid page programs is fixed as much as total counts included in the SVPC table, the sustained status may be broken if a valid page count (VPC) value of an actual storage device becomes smaller than the SVPC value in the SVPC table. Thus, an arbitrary interval may be added to an LPN order so that LPNs do not overlap one another in the whole write operation.

After that, a sequential fill is performed on all the blocks while adjusting the VPC in each block with reference to the SVPC table (S323). At this time, in the process of adjusting the VPC, locations of a valid page and an invalid page in the block may be randomly determined. If the locations of a valid page and an invalid page are concentrated to a specific area, a garbage collection occurs with frequency in the specific area and thus there is possibility that performance distortion occurs in the sustained status.

After that, a meta flush is performed. That is, map information of a storage device in a completed sustained status is stored (S324).

After that, optionally, integrity of meta information is verified (S325). For example, at every LPN, it may be checked whether one valid page exists and whether the whole SVPC included in the SVPC table is identical to the VPC being managed by the meta. The storage device 12 enters the sustained status through the process described above.

After that, performance comparison evaluation is performed (S330). For example, it may be checked whether a result value obtained by comparing a performance test of the storage device 12 in the sustained status in accordance with the sustained accelerating method described above with a performance test of an actual storage in the sustained status is within an arbitrary error range.

The performance test method of a storage device in a sustained status in accordance with the above exemplary embodiments can remarkably reduce the performance evaluation time compared with that of the conventional storage device by controlling the storage device to enter a sustained status with a minimum write operation or without a garbage collection using the SVPC information extracted from another storage device in the sustained status.

Figure 10:
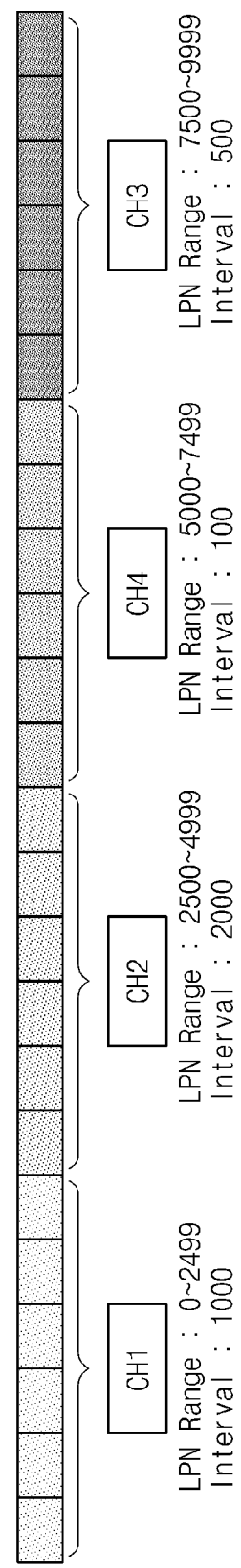
FIG. 10 is a drawing illustrating a method of deciding a range and an interval of LPN in a sustained status accelerating operation in accordance with an exemplary embodiment.

FIG. 10 is a drawing illustrating a method of deciding a range and an interval of LPN in a sustained status accelerating operation in accordance with an exemplary embodiment. Referring to FIG. 10, an LPN range and an interval of each of channels CH1-CH4 may be arbitrarily determined. For example, in the first channel CH1, an LPN may be generated while having intervals of 1000 from 0 and in the third channel CH3, an LPN may be generated while having intervals of 500 from 7500. The LPN range and the interval illustrated in FIG. 10 are only illustrative, and the LPN range and the interval can be determined differently.

Figure 11:
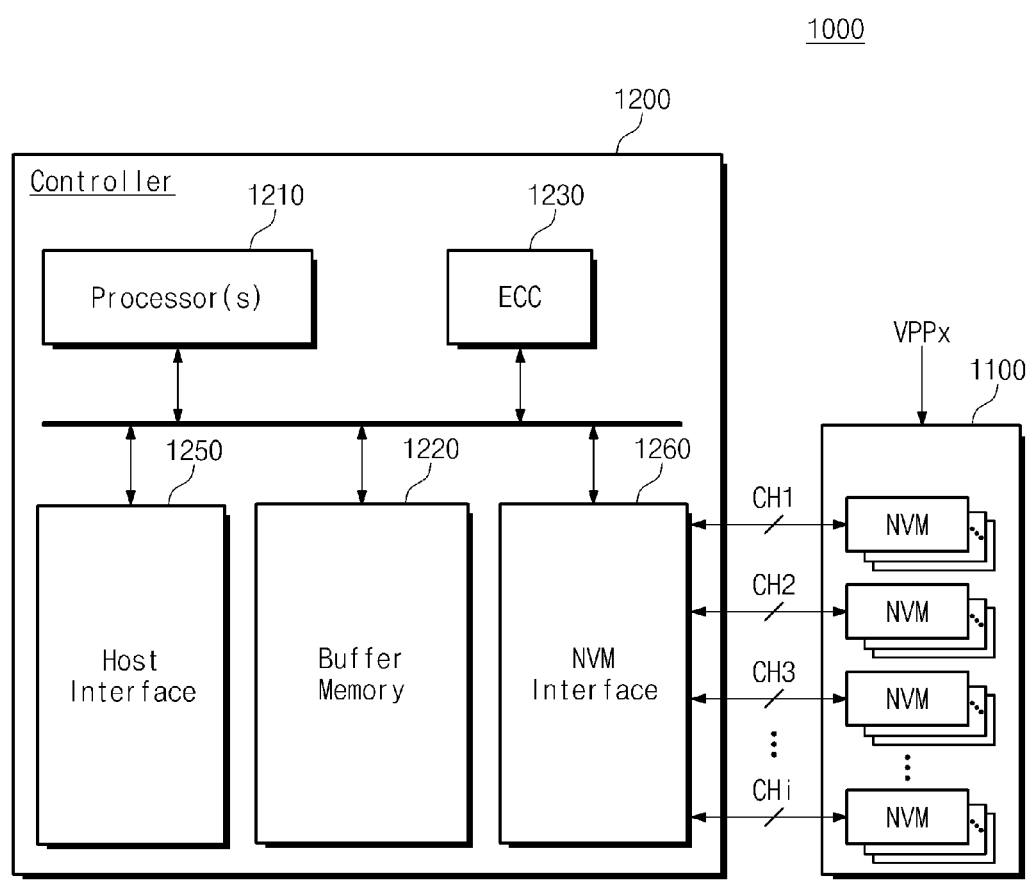
FIG. 11 is a block diagram illustrating a SSD in accordance with an exemplary embodiment.

The inventive concept is applicable to an SSD. FIG. 11 is a block diagram illustrating an SSD in accordance with an exemplary embodiment. Referring to FIG. 11, the SSD 1000 includes a plurality of nonvolatile memories 1100 and an SSD controller 1200.

The nonvolatile memories 1100 may be optionally configured to accept an external high voltage Vpp. Each of the nonvolatile memories 1100 may be embodied by the nonvolatile memory 100 illustrated in FIG. 2.

The SSD controller 1200 is connected to the nonvolatile memories 1100 through a plurality of channels CH1-Chi (i is an integer which is greater than or equal to 2). The SSD controller 1200 may be embodied by the memory controller 200 illustrated in FIG. 2.

The SSD controller 1200 includes at least one processor 1210, a buffer memory 1220, an error correction circuit (ECC) 1230, a host interface 1250, and a nonvolatile memory interface 1260.

The buffer memory 1220 temporarily stores data necessary for an operation of the memory controller 1200. The buffer memory 1220 may include a plurality of memory lines which store data or commands. The memory lines may be mapped to cache lines in many different ways. In FIG. 11, the buffer memory 1220 is located inside the memory controller 1200 but the inventive concept is not limited thereto. The buffer memory 1220 may be located outside the memory controller 1200.

The ECC 1230 can calculate an error correction code value of data to be programmed in a write operation, correct an error of data read in a read operation based on the error correction code value, and correct an error of data restored from the nonvolatile memory 1100 in a data restoration operation.

The ECC 1230 generates an error correction code for correcting a fail bit or an error bit of data received from the nonvolatile memory 100. The ECC 1230 performs error correction encoding of data being provided to the nonvolatile memory 1100 to form data to which a parity bit is added. The parity bit may be stored in the nonvolatile memory 1100. The ECC 1230 can perform error correction decoding on data output from the nonvolatile memory 1100. The ECC 1230 can correct an error using parity. The ECC 1230 can correct an error using coded modulation such as low density parity check (LDPC) coding, Bose-Chaudhuri-Hocquenghem (BCH) coding, turbo coding, Reed-Solomon (RS) coding, convolutional coding, recursive systematic code (RSC) coding, trellis-coded modulation (TCM), block coded modulation (BCM), etc.

Although not illustrated, a code memory which stores code data needed to operate the memory controller 1200 may be further included. The code memory may be embodied by a nonvolatile memory.

The host interface 1250 can provide an interface function with an external device. The host interface 1250 can be connected to a host through a parallel AT attachment (PATA) bus, a serial AT attachment (SATA) bus, small computer system interface (SCSI), USB, Peripheral Component Interconnect Express (PCIe), SD, Serial Attached SCSI (SAS), Universal Flash Storage (UFS), a NAND interface, etc.

The nonvolatile memory interface 1260 may provide an interface function with the nonvolatile memory 1100.

The SSD 1000 may enter a sustained status in response to a sustained state command SSTN_CMD.

In FIGS. 1 through 11, the SVPC table with respect to a storage in a sustained status is stored before the storage device 12 enters the sustained status. However, the inventive concept is not necessarily limited to thereto. The sustained status accelerating method may be embodied so that the SVPC table is transmitted from the host (or host tool) to the storage device 12 to test performance of the storage, according to an exemplary embodiment.

Figure 12:
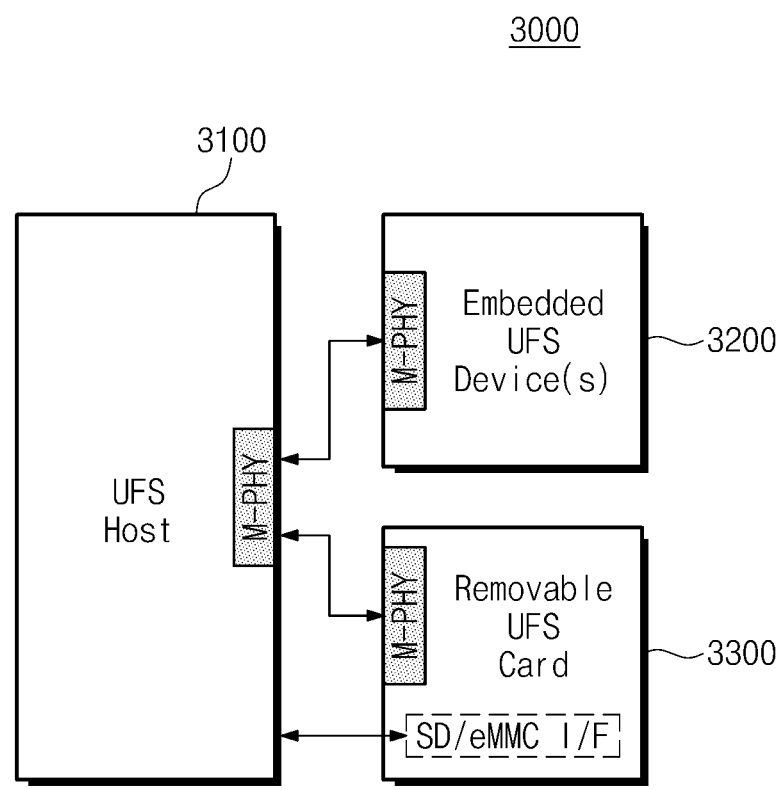
FIG. 12 is a block diagram illustrating a UFS in accordance with an exemplary embodiment.

The inventive concept is applicable to even a UFS. FIG. 12 is a block diagram illustrating a UFS system in accordance with an exemplary embodiment. Referring to FIG. 12, the UFS system 3000 may include a UFS host 3100, at least one embedded UFS 3200, and a removable UFS card 3300. A communication between the UFS host 3100 and the embedded UFS 3200 and a communication between the UFS host 3100 and the removable UFS card 3300 can be performed through a M-PHY layer.

At least one of the embedded UFS 3200 and the removable UFS card 3300 may be embodied by the storage device 12 illustrated in FIG. 1.

The UFS host 3100 may include a bridge to communicate with the removable UFS card 3300 not using the UFS protocol but using a different protocol. The UFS host 3100 can communicate with the removable UFS card 3300 using a variety of card protocols, for example, USB Flash Devices (UFDs), MultiMedia Card (MMC), embedded MMC (eMMC), SD, mini SD, MicroSD, etc.

Figure 13:
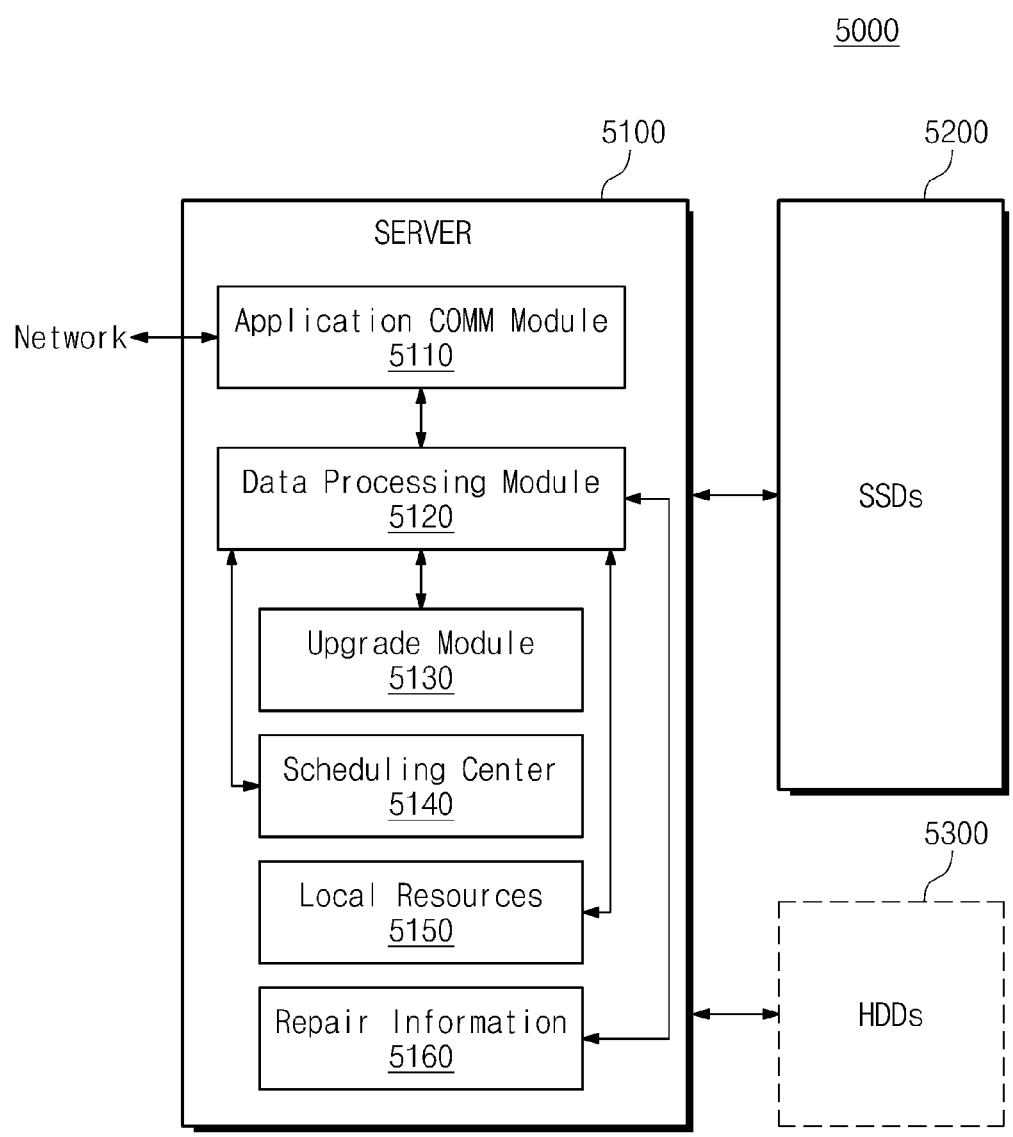
FIG. 13 is a block diagram illustrating a data center in accordance with an exemplary embodiment.

The storage described according to the above exemplary embodiments is applicable to a data server system. FIG. 13 is a block diagram illustrating a data sever system 5000 in accordance with an exemplary embodiment. Referring to FIG. 13, the data server system 5000 includes a server 5100 and a plurality of SSDs 5200 storing data needed to drive the server 5100. The SSDs 5200 is embodied by the same constitution and operation as the storage device 12 illustrated in FIG. 1.

The server 5100 includes an application communication module 5110, a data processing module 5120, an upgrade module 5130, a scheduling center 5140, a local resource module 5150, and a repair information module 5160. The application communication module 5110 is embodied so that the server 5100 communicates with a computing system connected to a network or the sever 5100 and the SSDs 5200 communicate with each other. The application communication module 5110 transmits data or information applied through a user interface. The data processing module 5120 is linked to the local resource module 5150. The local resource module 5150 applies a list of repair shops/dealers/technical information to a user on the basis of data or information input in the server 5100.

The upgrade module 5130 interfaces with the data processing module 5120. The upgrade module 5130 upgrades firmware, a reset code, a diagnosis system upgrade or other information to an appliance on the basis of data or information transmitted from the SSDs 5200. The scheduling center 5140 allows a real time option to a user on the basis of data or information input to the server 5100.

The repair information module 5160 interfaces with the data processing module 5120. The repair information module 5160 is used to apply repair related information (for example, audio, video, or document file) to a user. The data processing module 5120 packages related information on the basis of information transmitted from the SSDs 5200. After that, those packaged information may be transmitted to the SSDs 5200 or may be displayed.

The hard disk drives (HDDs) 5300 may be optionally connected to the server 5100. The data server system 5000 can improve reliability of data stored in the data server by rapidly performing a test of a storage device in a sustained status anytime and rapidly replacing the storage device according to a test result.

The memory system or storage device in accordance with the above exemplary embodiments may be mounted using packages such as package on package (PoP), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi-chip package (MCP), wafer-level fabricated package (WFP) and wafer-level processed stack package (WSP).

The storage devices described above are applicable to a variety of mobile devices such as a smart phone, a wearable watch, a smart glass, etc.

As described above, the storage device in accordance with the above exemplary embodiments rapidly enters a sustained status using an SVPC table and thereby can rapidly perform a performance test of the storage in the sustained status.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements or units represented by a block as illustrated in FIGS. 2, 11 and 13, for example, the sustained status accelerating module illustrated in FIG. 2, may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although some exemplary embodiments have been shown and described, it will be appreciated by those skilled in the art that changes may be made in these embodiments without departing from the principles and spirit of the inventive concept, the scope of which is defined in the appended claims and their equivalents. Therefore, the above-disclosed subject matter is to be considered illustrative, and not restrictive.

What is claimed is:

1. A method for accelerating a sustained status for a storage device comprising at least one nonvolatile memory and a memory controller configured to control the at least one nonvolatile memory, the method comprising:
controlling the storage device to receive a sustained status command from the outside; and
controlling the storage device to enter the sustained status using a sustained valid page count (SVPC) table in response to the sustained status command so that each of a plurality of blocks included in the storage device has a value greater than a predetermined valid page count,
wherein the SVPC table comprises a valid page count with respect to each of the plurality of blocks, and
wherein the SVPC table is formed using SVPC information extracted from another storage device in the sustained status.

2. The method of claim 1, wherein the sustained status command is received from a host connected to the storage device.

3. The method of claim 1, wherein the SVPC table is stored in the at least one nonvolatile memory in a manufacturing process of the storage device.

4. The method of claim 1, further comprising controlling the memory controller to read the SVPC table from the at least one nonvolatile memory in response to the sustained status command.

5. The method of claim 1, wherein the controlling the storage device to enter the sustained status comprises initializing meta information of the storage device.

6. The method of claim 5, wherein the controlling the storage device to enter the sustained status comprises determining whether a first page of a first block of the plurality of blocks is a valid page or an invalid page based on the SVPC table.

7. The method of claim 6, wherein the controlling the storage device to enter the sustained status comprises forming the first page in the first block through a normal write operation, and
wherein in the normal write operation, map information about the normal write operation is updated.

8. The method of claim 7, wherein the controlling the storage device to enter the sustained status comprises forming the first page in the first block through a dummy write operation, and
wherein in the dummy write operation, map information about the dummy write operation is not updated.

9. The method of claim 1, wherein the controlling the storage device to enter the sustained status comprises determining a range or an interval of a logical page number to perform a write operation using the SVPC table.

10. The method of claim 9, wherein the controlling the storage device to enter the sustained status comprises sequentially filling data in the plurality of blocks by performing a normal write operation on the plurality of blocks and performing a dummy write operation corresponding to an invalid page while adjusting the range or the interval of the logical page number so that a valid page is randomly distributed in at least one block of the plurality of blocks while adjusting the valid page count based on the SVPC table.

11. The method of claim 10, wherein the controlling the storage device to enter the sustained status comprises updating meta information of the storage device in the sustained status.

12. The method of claim 11, wherein the controlling the storage device to enter the sustained status comprises testing integrity of the meta information as updated.

13. The method of claim 11, wherein the sustained status command is input for a performance test of the storage device.

14. A storage device comprising:
at least one nonvolatile memory which is configured to store a sustained valid page count table (an SVPC table) and comprises a plurality of blocks each having a plurality of pages; and
a memory controller configured to control the at least one nonvolatile memory,
wherein the memory controller comprises:
a buffer memory configured to store the SVPC table as read from the at least one nonvolatile memory in response to receiving a sustained status command; and
a sustained status accelerating module configured to form a sustained status through one or more normal write operations and a dummy write operation using the SVPC table, and
wherein a number of the one or more normal write operations performed is determined as corresponding to a valid page count in the SVPC table,
wherein the SVPC table is formed using SVPC information extracted from another storage device in the sustained status.

15. The storage device of claim 14, wherein the SVPC table is stored in the at least one nonvolatile memory in a manufacturing process of the storage device.

16. The storage device of claim 14, wherein the sustained status accelerating module is configured to determine at least one of a valid page and an invalid page in at least one block of the plurality of blocks based on the SVPC table.

17. The storage device of claim 14, wherein the sustained status accelerating module is configured to perform the dummy write operation to form an invalid page in at least one block of the plurality of blocks, and update map information about the dummy write operation, and
wherein the sustained status accelerating module is configured to perform a normal write operation to form a valid page corresponding to the SVPC table in the at least one block, update map information about the normal write operation, and determine a range and an interval of a logical page number on which the normal write operation is performed according to a predetermined value.

18. A method for performance test of a storage device, the method comprising:
obtaining a sustained valid page count table (an SVPC table) from another storage device in a sustained status;
forming the storage device in the sustained status by performing at least one dummy write operation or one or more normal write operations, a number of the one or more normal write operations performed is determined corresponding to a valid page count in the SVPC table; and
performing performance comparison evaluation of the storage device,
wherein the SVPC table is formed using SVPC information extracted from another storage device in the sustained status.

19. The method of claim 18, the forming the storage device in the sustained status further comprise:
updating meta information of the storage device; and
verifying integrity of the meta information of the storage device.

* * * * *